(12) United States Patent
Anwer et al.

(10) Patent No.: US 10,833,937 B2
(45) Date of Patent: Nov. 10, 2020

(54) DETECT IMPACT OF NETWORK MAINTENANCE IN SOFTWARE DEFINED INFRASTRUCTURE

(71) Applicant: AT&T Intellectual Property I, L.P., Atlanta, GA (US)

(72) Inventors: Muhammad Bilal Anwer, Branchburg, NJ (US); Vijay Gopalakrishnan, Edison, NJ (US); Aisha Syed, Salt Lake City, UT (US); Jacobus Erasmus Van der Merwe, Salt Lake City, UT (US)

(73) Assignees: AT&T Intellectual Property I, L.P., Atlanta, GA (US); University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 16/373,284

(22) Filed: Apr. 2, 2019

(65) Prior Publication Data
US 2020/0322218 A1 Oct. 8, 2020

(51) Int. Cl.
*H04L 12/24* (2006.01)

(52) U.S. Cl.
CPC ...... *H04L 41/0866* (2013.01); *H04L 41/0893* (2013.01); *H04L 41/14* (2013.01)

(58) Field of Classification Search
None
See application file for complete search history.

(56) References Cited

U.S. PATENT DOCUMENTS

| | | | | |
|---|---|---|---|---|
| 9,967,745 | B2* | 5/2018 | Marquardt | H04W 12/06 |
| 2016/0182567 | A1* | 6/2016 | Sood | H04L 63/104 |
| | | | | 726/1 |
| 2018/0287902 | A1* | 10/2018 | Chitalia | H04L 43/045 |

OTHER PUBLICATIONS

Massey Jr.; "The Kolmogorov-Smirnov Test for Goodness of Fit"; Journal of the American Statistical Association; vol. 46; 1951; p. 68-78.
R. A. Fisher; "Theory of Statistical Estimation"; Mathematical Proceedings of the Cambridge Philosophical Society; vol. 22; May 1925; p. 700-725.
Gurevitch et al.; "Meta-analysis and the science of research synthesis"; Nature; vol. 555; Mar. 2018; p. 175-182.

\* cited by examiner

*Primary Examiner* — Jeffrey R Swearingen
(74) *Attorney, Agent, or Firm* — BakerHostetler

(57) ABSTRACT

A system may assist with checking policy impact in a software-defined infrastructure environment. The system's data analysis may enable it to discover and quantify the impact of policies on software-defined infrastructure objects in the same or different layers.

20 Claims, 11 Drawing Sheets

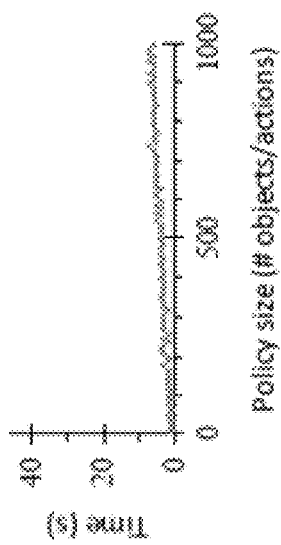
FIG. 10
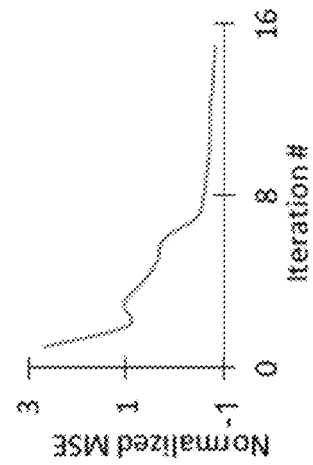
FIG. 13
FIG. 9
FIG. 12
FIG. 8
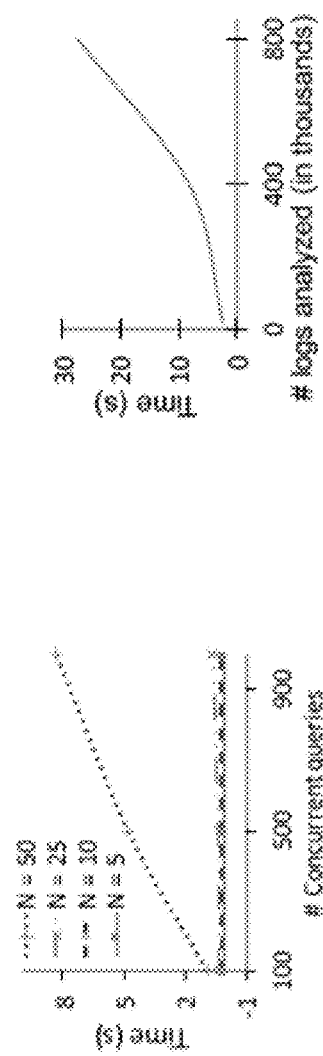
FIG. 11

DETECT IMPACT OF NETWORK MAINTENANCE IN SOFTWARE DEFINED INFRASTRUCTURE

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual central processing units (vCPUs), and network interfaces or network interface cards (NICs). Cloud systems are complex multi-layer hardware and software systems that consist of multiple components, interacting with each other through complicated mechanisms. The operation and management of a large-scale cloud is highly susceptible to anomalies through faulty maintenance. Proactively identifying the root causes is often difficult to predict or diagnose even with the skilled operators.

This disclosure is directed to addressing issues in the existing technology.

SUMMARY

The emergence of network function virtualization (NFV) and software defined networking (SDN) has resulted in networks being realized as software defined infrastructures (SDIs). The dynamicity and flexibility offered by SDIs introduces new challenges in ensuring that policy changes do not result in unintended consequences. These can range from the breakdown of basic network invariants, to degradation of network performance. Disclosed herein is a platform for safe DEployment of POlicy in a Software Defined Infrastructure (e.g., Depo). The Depo framework (or referred herein as Depo) may enable automated discovery and quantification of the potential impact of new orchestration and service level SDI policies. The disclosed approach may use knowledge modeling, data analysis, machine learning, or emulation techniques in a sandbox SDI.

In an example, a vehicle may include a processor and a memory coupled with the processor that effectuates operations. The operations may include generating an emulation environment; running an emulation, and determining an impact based on the running emulation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 8 illustrates Orchestration time in an exemplary implementation.

FIG. 9 illustrates KG insertion time in an exemplary implementation.

FIG. 10 illustrates policy parsing time in an exemplary implementation.

FIG. 11 illustrates parameter generation time in an exemplary implementation.

FIG. 12 data analysis time in an exemplary implementation.

FIG. 13 illustrates a Normalized mean squared error (NMSE) calculated over error between ground truth, and predictions of model created by Depo for an exemplary implementation.

DETAILED DESCRIPTION

Figure 1:
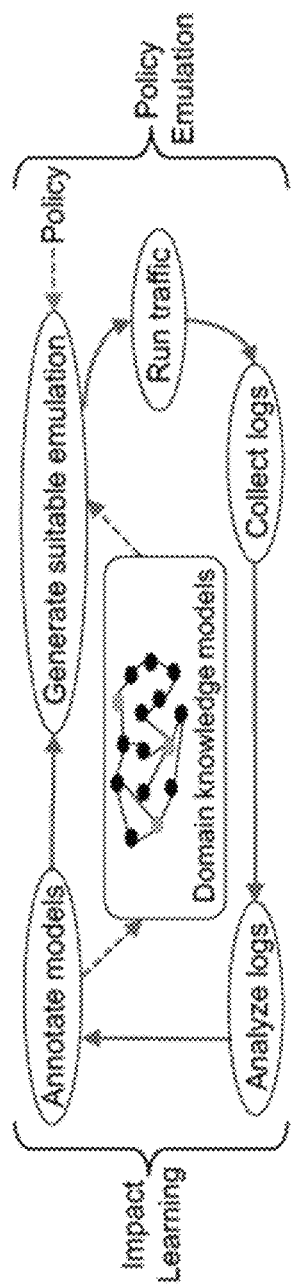
FIG. 1 illustrates an exemplary flow for DEployment of POlicy (Depo) in a Software Defined Infrastructure.

The emergence of network function virtualization (NFV) and software defined networking (SDN) has resulted in networks being realized as software defined infrastructures (SDIs). The dynamicity and flexibility offered by SDIs introduces new challenges in ensuring that policy changes do not result in unintended consequences. These can range from the breakdown of basic network invariants, to degradation of network performance. Disclosed herein is the Depo framework (or referred herein as Depo) that enables automated discovery. The disclosed approach may use knowledge modeling or data analysis in a sandbox SDI. Disclosed herein is an example in which the approach is evaluated over a testbed SDI with a 4G LTE/EPC broadband service.

Emerging software defined infrastructures (SDIs), consisting of software defined networking (SDN), network functions virtualization (NFV), cloud computing, etc. are being embraced by network service providers and equipment vendors. The inherent flexibility and agility of an SDI environment may enable better resource management, virtualized network functions (VNF) allowing rapid service composition, dynamic service deployment and evolution, custom data planes, and control plane modifications. SDIs are anticipated to be key enablers for future mobile network architectures and related services being developed for 5G.

An SDI ecosystem may be closed-loop, policy-driven control platforms. The SDI control platforms may include controllers or orchestrators (with an associated policy engine) that utilize network or service object templates to automate the workflows used for managing the physical or virtual infrastructure that creates the SDI, and for the composition, instantiation, evolution, or lifecycle management of the services that run on top of it. Automations may be done through policies deployed via a policy engine. Policies may be considered rules, conditions, requirements, constraints, attributes, or needs that must be provided, maintained, or enforced. At a lower level, policy may involve machine-readable rules enabling actions to be taken based on triggers, such as requests. Policies often consider specific conditions or events, such as triggering specific policies when conditions are met or selecting specific outcomes of the evaluated policies appropriate to current conditions. Policies may allow for rapid modification or updating of behavior without rewriting software code fits well in the complex and dynamic SDI environment.

Earlier policy related efforts mostly focused on low-level configuration and networking policies (e.g., BGP or SDN rules). The SDI environment configurations allows writing orchestration and service level policies, in addition to the low-level networking policies and configuration updates. Since SDI control platforms are being designed to be templates-based, the domain experts can thus write policies in a high-level manner using references to mechanisms specified through SDI object templates (possibly created by different domain experts or vendors). The SDI may be considered layered (e.g., physical infrastructure, virtual infrastructure or VNFs, and the service layers), with complex horizontal and vertical interactions between objects at the various layers, controlled by policies written by potentially independent actors. This cross-layer interaction and presence of multiple actors coupled with the dynamism due to capabilities from NFV/SDN (scaling, live migrations, live topological updates or insertion of new functionality) makes it non-trivial and impractical for humans to manually trace the impact of their policies. Thus, there is a need for a tool to be coupled with the SDI such that policies can be automatically tested for impact before being deployed in production.

The following are disclosed herein, not necessarily in the order provided. First, the Depo framework is disclosed, which, given SDI orchestration and service-level policies, may impact such policies on objects to be determined and quantified in an SDI environment. Second, a systematic approach is provided. The systematic approach to structuring domain knowledge in a model may enable more informed policy writing and policy impact checking. There may be further annotation and verification of the initial domain knowledge model by incorporating knowledge learnt through SDI emulations.

Examples are provided throughout with regard to implementation of Depo and its valuation using policies in a testbed SDI environment. Depo may be able to capture the impact of policies and can reuse and revise learnt knowledge.

Conventional approaches to enact network change include multiple stages during which network changes can be checked and validated before deployment, e.g., manual planning, static or online verification and validation, simulation, emulations, phased rollout or first field application (FFA), and canaries. Note simulation should model the internal state of the system and based on model accuracy the simulation can be a true representation or not, while emulation may not model the internal state but tries to copy the original system with limited set of resources. The focus of the conventional efforts has been on low-level configuration updates related to the network and routing layers or has enabled limited automation and required the presence of domain experts for designing the test environment needed for policy or update checking. With Depo, the virtual layers and service layers may be considered, which are made possible by the SDI and perform knowledge-based modeling to capture cross-layer interactions as well as automate the process of suitable test environment generation.

As disclosed, conventional approaches may just include conventional networking and routing policies. However, as disclosed in more detail herein, Depo presents SDI service and orchestration policies and may provide a generic testing framework for learning the policies impact in the SDI ecosystem. Depo may serve as a practical step towards exploring the challenges and opportunities in this space through prototyping an end-to-end impact discovery or checking system. Note discovery" may be done before introducing a change and checks are placed once the change is introduced and there is an attempt to stop the unintended effect of the change on system.

Figure 2A:
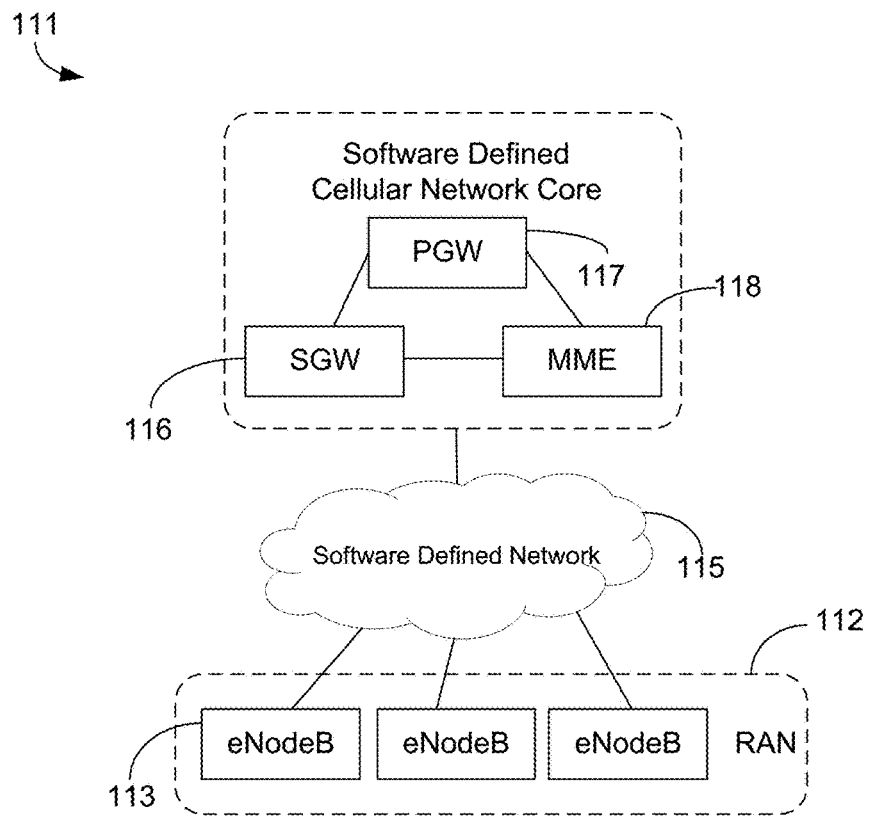
FIG. 2A illustrates an exemplary Evolved Packet Core (EPC) architecture.

Depo Context and Use-Cases are disclosed below. The standard 4G LTE/EPC broadband may be a use-case service. FIG. 2A illustrates an exemplary EPC architecture 111 that may include the Radio Access Network (RAN) 112 (e.g., eNodeB 113 and more). Base stations (e.g., eNodeB 113) are part of RAN 112 and wirelessly connect to the user equipment (UE) (e.g., mobile devices). The EPC core generally includes an MME, SGW, and PGW. MME 118 (Mobility Management Entity) is a control plane entity and handles UE authentication, registration, and mobility. SGW 116 (Serving Gateway) is a data path element and forwards user traffic coming from RAN 112 to PGW 117 (Packet Data Network Gateway) which serves as the gateway to external networks. SGW 116, PGW 117, or eNodeB 113 may also handle control plane functions.

Figure 2B:
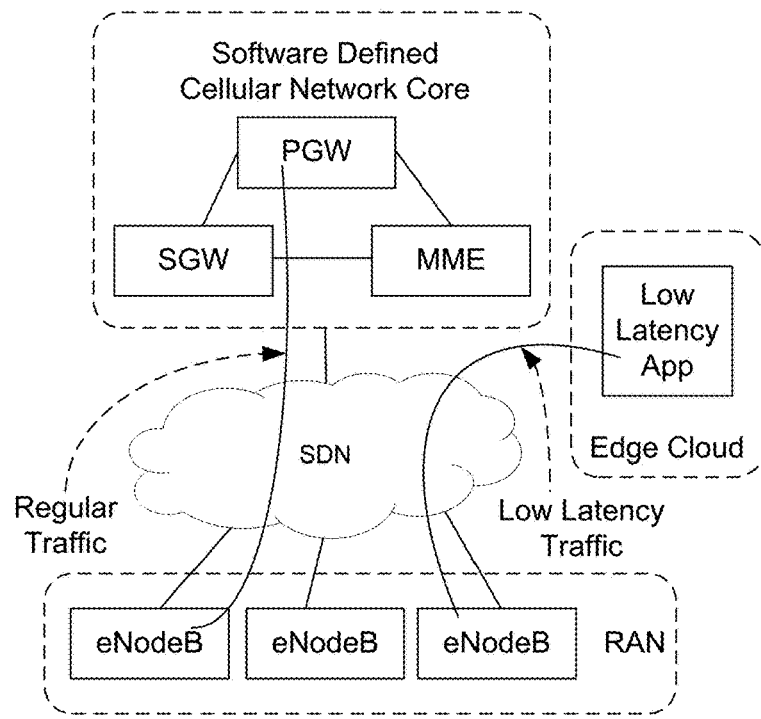
FIG. 2B illustrates an exemplary SMORE architecture.

FIG. 2B illustrates an exemplary EPC variant with selective edge cloud traffic offloading functionality. The cloud architecture of FIG. 2B may be called Software-defined network Mobile Offloading aRchitecturE (SMORE) and is a second use-case of SDI service. Here webservers are the example low-latency apps in the edge cloud.

Terminology associated with this subject matter is disclosed below. In the SDI ecosystem, parameterizable templates may serve as the specification or 'object type' for SDI components and services. Instantiating them through an SDI orchestrator may instances or objects of them to be created in the SDI. This is similar to classes and objects (instances) in an object oriented programming language. Equivalent to classes in this case will be a type of VNF. Lets say you have a "Firewall" type of VNF. This VNF can have multiple instances. i.e. multiple VMs each representing a "Firewall" instance. Templates can be 'container'-type templates such that they describe a type composed of one or more other SDI object types. An example template may be a service template, such as, EPC, or can be composed of component templates, such as, MME, SGW, PGW, eNodeB. Similarly, a SMORE service template can be composed of components, such as, the webserver in the edge cloud, a load balancer, or cache components, etc. Note that an 'instance' may be considered an object of a particular type. While "object" is used for any type of "instance".

Templates may include variables, lifecycle and management mechanisms, and policies. Mechanisms may be related to routing (e.g., push, remove, or update flows), scaling, load balancing, placement, migration, performance tuning, etc. For example, init, start, stop, migrate, scaleUp, update, configureIPv4, are some typical mechanisms available in component or service templates in an SDI. Life Cycle and Management Mechanisms can include, rebooting a VM, creating a new VM, changing configuration of a device etc.

Table 1 shows example variables in the templates of various SDI object types we considered. For space reasons, some of the related variables are shown as grouped together, e.g., Server.ifaceVars and VNF.migrationVars represent variables related to Server interface configuration (e.g., IPv4Addr, MACAddr) and VNF migrations (e.g., numMigrationsPast5Min or numFailedMigrations). Also, variables from different VNFs (e.g., S/PGW, SMORE_Webserver or SMORE_Cache), and Services (e.g., EPC, SMORE) are shown grouped together under the VNF and Service headers.

for policy impact checking under various workload conditions. Since workload variables are not relevant to template instantiation they are typically not captured as part of the of SDI templates. However, we extend the templates to add them.

TABLE 1

Example Variables in SDI

| Server | VM | Switch or Link | VNF | Service |
|---|---|---|---|---|
| location | location | location | location | topologyVars |
| status | status | status | status | numENB |
| rateStatusChange | rateStatusChange | ifaceVariables | type | numSGW |
| totalMem | totalMem | rateStatusChange | totalMem | numPGW |
| allocatedMem | numCPU | numFlaps | numCPU | numMME |
| numCPU | version | latency | version | numWebserver |
| numAllocatedCPU | type | totalMem | cpuUsage | latency |
| cpuOversubscription | cpuUsage | numCPU | memUsage | throughput |
| numAllocatedVM | memUsage | version | throughput | Workload |
| numRunningVM | migrationVars | type | latency | numUE |
| version | numNeighborVM | cpuUsage | topologyVars | rateOfRequests |
| memUsage | osImage | memUsage | migrationVars | interarrivalTime |
| cpuUsage | ifaceVars | propagationDelay | cacheVars | num/rateOfMobility |
| type | | | | concurrentVNF/Service |
| ifaceVars | | | | |

For systematic impact analysis, variables may be categorized as provided below: (1) configuration/configurable, (2) observed, and (3) workload variables. In addition, the domain expert or policy writer may tag certain configuration and workload variables to be emulation environment parameters. A domain expert may annotate configuration and workload variables as such in the templates.

Configuration variables may be considered template variables that may be modified (or configured) directly using template mechanisms, e.g., IP address, location (configurable using e.g., VNF migrations), num (i.e., number) of VMs, cpuOversubscription, num of CPUs, etc. In addition, configurable emulation environment parameters may be considered to be part of this category. For example, num of CPUs for a server may be considered a configurable variable since it may be varied across emulation runs by picking server types that have varying number of CPUs. Observed variables or (performance) metrics may be defined as those that cannot be directly configured using mechanisms or emulation parameter selection, such as cpu usage, average latency seen by subscribers in a location, percentage of failed UE handoffs, etc. Workload variables may represent features of service workloads, such as num of UEs, request rates, interarrival time distribution, etc. Values for workload variables may be encoded by the domain expert or policy writer running the emulations. For example, their values can come from realistic traffic datasets (e.g., scenarios that usually occur in a day-to-day like scenario), or the policy writer may want to also use values that have not been seen in realistic datasets. Workload variables may also be tagged as emulation environment parameters in which case they are used to control workload generation during emulation runs Depo may be used to determine the impact of policies, wherein 'impact' (also referred herein as affect) is described in more detail below. Policies when activated, invoke object mechanisms, which in turn impact configuration variables (e.g., modify their values), which in turn impact the observed variables (or performance metrics), in the presence of workload variables (e.g., request rates). The trace may be captured, from policy, down to the configuration and observed variables impacted. This is because both configuration and observed variable impacts may be due to unintended consequences which were not part of the policy writer's intent. A statistically significant change in the value of a variable may be considered as an impact on that variable. Significance level is a tunable parameter (e.g., 95% confidence using p-values with alpha set to 0.05). When a policy is tested, the correlated changes at the given significance level, on object variables in the context of an object template are output as impact.

Policy examples. Listings 1 to 6 show the pseudocode for example policies used herein, written for the SDI environment with the two services introduced earlier: EPC, and a variation of EPC with edge cloud offloading (referred to as SMORE herein). It is considered if-then style policies that are written in the context of mechanisms and variables exposed by SDI object templates.

| Listing 1: Update server | Listing 2: Oversubscribe |
|---|---|
| when:<br>    Server.updateAvailable == True AND<br>    Server.locatedAtEdge == True<br>then: | when:<br>    Server.cpuUsage_10minAvg < THRESH1<br>    //THRESH1 = 50%<br>then: |

| Listing 1: Update server | Listing 2: Oversubscribe |
|---|---|
| Server.update( ) | Server.setCPU_Oversub(oversubPerc = THRESH2) //THRESH2 = 50% |

| Listing 3: Scaling SGW | Listing 4: Scaling SMORE |
|---|---|
| when:<br>    SGW.cpuUsage >= THRESH<br>    //THRESH = 70%<br>then:<br>    EPC.scaleUpSGW( ) | when:<br>    SMORE_Webserver.cpuUsage_5minAvg<br>        >= THRESH //THRESH = 70%<br>then:<br>    SMORE.scaleUpWebserver( ) |

| Listing 5: SMORE caching | Listing 6: SMORE offload |
|---|---|
| when:<br>    SMORE.subscriberLatency_5minAvg >=<br>        THRESH<br>    //THRESH = 30ms<br>then:<br>    SMORE.setCaching( ) | when:<br>    EPC. subs criberLatency_10minAvg >=<br>        THRESH<br>    //THRESH = 30ms<br>then:<br>    EPC.augmentSMORE(subscriberList) |

Discussed below is a summary of the listings, which are exemplary policies. Listing 1 shows a Server update policy which applies available updates on all servers in the edge cloud location. Listing 2 shows a Server policy that enables CPU oversubscription by some threshold if the cpu usage has been high, e.g., it causes the SDI orchestrator to pack more VMs on the Server instances by oversubscribing the CPU resource. Listing 3 shows an EPC service policy for SGW scale up. Listing 4 shows an SMORE service policy for scale up of its webserver component. Listing 5 shows a SMORE policy that enables caching for the webservers if SMORE service's subscribers are seeing a higher latency. Finally, Listing 6 shows a cross-service policy where if some EPC service's subscribers are seeing a higher latency to an Internet webserver, then the SMORE service is dynamically enabled for specific subscriber UEs, e.g., selective edge cloud offloading is enabled for this EPC instance for subscribers mentioned in the subscriber list. This would include the SDI orchestrator instantiating SMORE service components (e.g., webserver in the edge cloud), and configuring networking (e.g., SDN rules) so that EPC traffic for specific subscribers is diverted to the webserver in the edge cloud.

As observed from the listings, the policy writer is allowed to specify policy variables, such as, threshold variables, and the associated range of values they can take. For example, for Listing 2, the writer may specify the range taken by THRESH2 to be [10, 50, 100] to test only few oversubscription percentages, or [1 . . . 100] to test percentage values ranging from 1 to 100. Since the SDI is a very dynamic environment, hardcoding threshold values does not always result in intended consequences. Thus, during emulations, Depo iterates on the given policy variables (through a 'knob turning' process described later) and can output the learnt impact seen for them.

Large number of knobs. There is typically a large number of test environment variables, such as, emulation parameters and workload variables that may be varied when testing a policy for impact. For example, emulation parameters may be traffic rates, num of UEs, number of service components, types of hosting hardware (e.g., Server types with varying num of CPUs), etc. These variables may be termed knobs. These knobs can also include threshold variables specified in the policy specifications. A large number of knobs and large number of values for each knob may result in higher costs for policy testing. In Depo, the large number is considered and possible way of dealing with this is by automating the impact checking process and using a greedy approach called knob turning which first varies and explores knobs that result in more information/knowledge gain (in terms of their impact on observed variables or performance metrics).

Hardcoded thresholds in policies. Policies often have hardcoded threshold values. These are based on the past knowledge and assumptions (e.g., from domain experts) and thus may not always be accurate. Conventionally, experts test various thresholds in their policies, observe the behavior of the policy in test setups or in production, and pick a threshold based on those observations. However, in an SDI, things change frequently, and hardcoded values may not work. Depo allows the policy writer to specify thresholds as policy variables. These variables may be considered as emulation environment knobs and a knob turning process may be used to test different thresholds to systematically learn their impact. Using emulations allows both realism and agility in testing.

Non-trivial to quantify variable-level relationships. While domain experts may know dependency relationships between various object types, however, it is non-trivial to discover and quantify variable-level knowledge. Conventionally, to get this level of knowledge, different test configurations are tried out by domain experts and effect on dependent variables are recorded under those varying conditions. Again, this process is automated using the disclosed emulation framework and subsequent data analysis that generates ML models that help quantify variable-level impacts.

Figure 3:
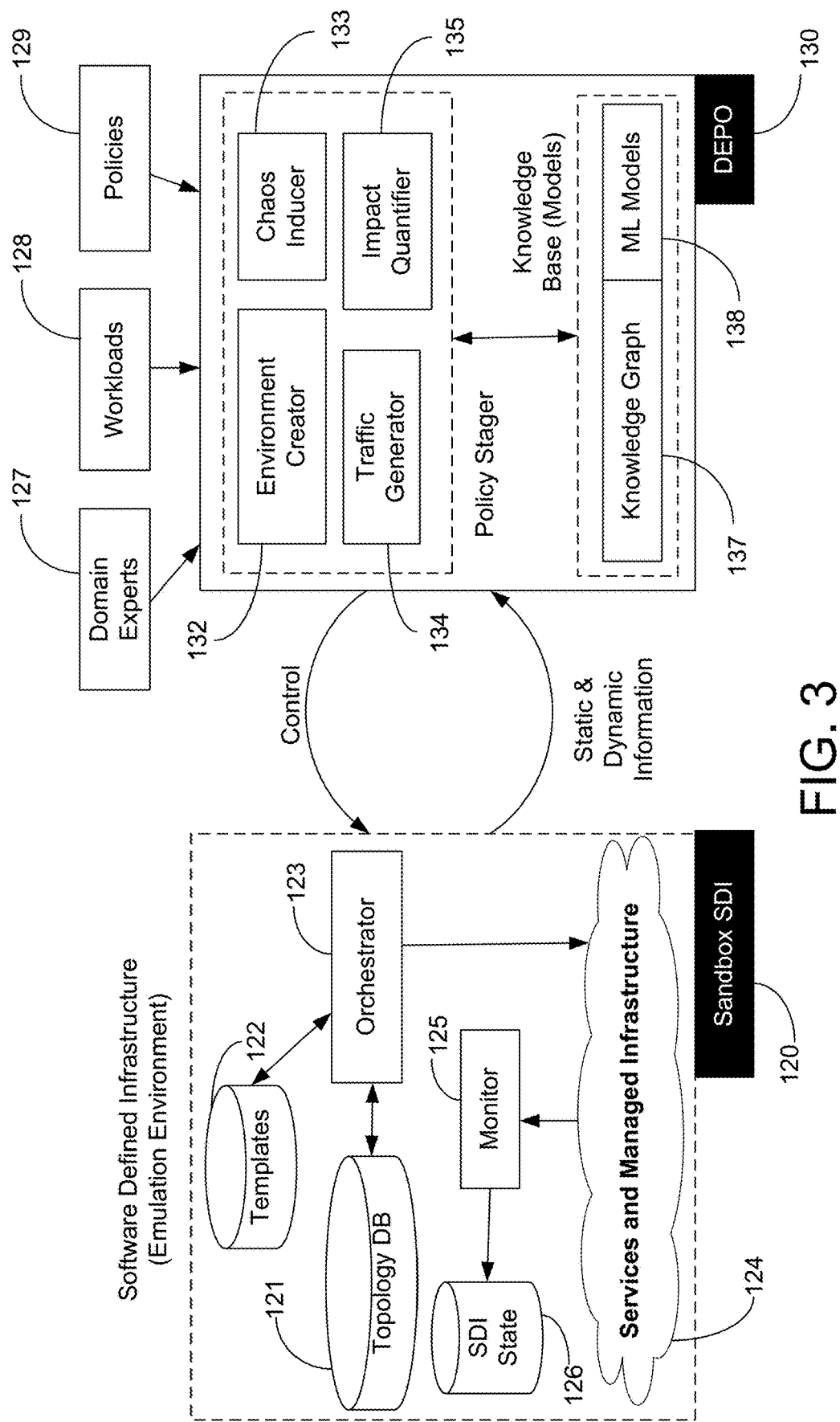
FIG. 3 illustrates Depo in the context of an SDI.

FIG. 3 illustrates an exemplary Depo architecture in the context of a Software Defined Infrastructure (SDI). Sandbox SDI 120 may be a template-driven environment where Orchestrator 123 receives service requests and makes use of templates (e.g., from template database 122) and topology information (e.g., from topology database 121) to instantiate virtualized service instances on managed infrastructure (e.g., service and managed infrastructure 124). SDI monitoring module 125 may monitor the state of the SDI infrastructure and SDI state database 126 may store the monitored information about the existing state of network that's extracted using SDI monitoring module 125. The system may have varying level of network information, bandwidth, latency, etc.

Depo 130 may interface with SDI sandbox 120 to run emulations and analyze the impact of policies on the service and managed infrastructure 124 it hosts. For purposes of emulation, Depo 130 has access to SDI sandbox 120 instead of interfacing directly with a production SDI. SDI sandbox 120 can be a lab network associated with the production SDI.

Depo 130 may have components that include policy stager 131 that performs the process of policy impact learning, and knowledge base 136 that records the learnt knowledge. Knowledge Base 136 may include knowledge graph (KG) 137 or machine learning (ML) models 138. KG 137 data structure may be used to encode domain knowledge. ML models 138 may be created during the impact learning process. Policy stager 131 and Knowledge Base 136 are discussed in more detail below.

KG 137 captures knowledge in the form of facts which may be 3-tuples of the form "entity1 relationship entity2" (e.g., server hasVariable serverCpuUsage, or serverCpuUsage affects VNFLatency). KG 137 may be populated with both static knowledge and dynamic knowledge. Static knowledge may be composed of knowledge provided by Domain Experts in the form of knowledge models that capture known relationships between entities at multiple layers in the infrastructure, as well as knowledge gleaned from service information or topology information obtained from template database 122 (e.g., a service template repository) and topology DB 121 in the SDI.

Dynamic knowledge may include knowledge learnt during the policy impact checking process performed by policy stager 131. This may involve policy stager 131 using the SDI to create emulations, deploying policies, and annotating KG 137 with dynamic knowledge learnt through analyzing the information collected during these emulations. This information may come from traces of orchestrator 123 actions and templates' mechanism executions, and monitoring logs from the infrastructure. To enable this, orchestrator 123 and the templates 122 may be instrumented to log mechanism invocations (traces), and the policies themselves may be instrumented as well. The interface to the SDI (e.g., production or sandbox) makes these logs available to policy stager 131 for analysis. Policy stager 131 may include environment creator 132, chaos inducer 133, traffic generator 134, or impact quantifier 135, which are discussed in more detail herein.

Environment creator 132 may take policies as input and generate suitable emulation environment configurations and may direct orchestrator 123 to instantiate them. It also may generate configuration related to traffic workload variables and interface with traffic generator 134 to control traffic generation in emulations. This may allow for policy impact checking in varying workload conditions. Chaos inducer 133 may be used by policy stager 131 to perform chaos engineering during these emulations (e.g., killing servers and service component instances according to a given failure distribution or cause performance degradations to create noise during emulation runs). Chaos inducer 133 tries to randomly introduce chaos to check impacts. Impact quantifier 135 may analyze the emulation logs and systematically quantify a policy's impact, and in doing so, the impact of configuration variables and mechanisms available on object types that are referred to by these policies. The main goal of this learning process is to annotate KG 137 with learned knowledge about impact. If a generic relationship is observed between X and Y such that X is seen to 'affect' Y, then we create an 'X affects Y' relationship in KG 137. Here, X and Y can be mechanisms, variables, policies.

Modeling Knowledge in KG: KG 137 is described in more detail below. Knowledge in KG 137 may be organized to facilitate and enable automated policy impact detection. The unit of data storage and modeling in KG 137 may be considered afact, a 3-tuple of the form (entity1 relationship entity2), where each entity is represented by a node in KG 137 and the relationship is shown using an annotated edge connecting the two related nodes. See FIG. 4. Multiple relationship edges with varying annotations may exist between the nodes which allows different applications insert their own semantics over the raw data in KG 137 by adding overlays created using different relationship edges. Additionally, the nodes and relationships can be annotated with properties. For example, timestamps may be added as properties, since the notion of time may be part of the knowledge modeling. This allows KG 137 to record changing state of SDI sandbox 120 and allow for query primitives to accordingly do time-based retrievals.

Figure 4:
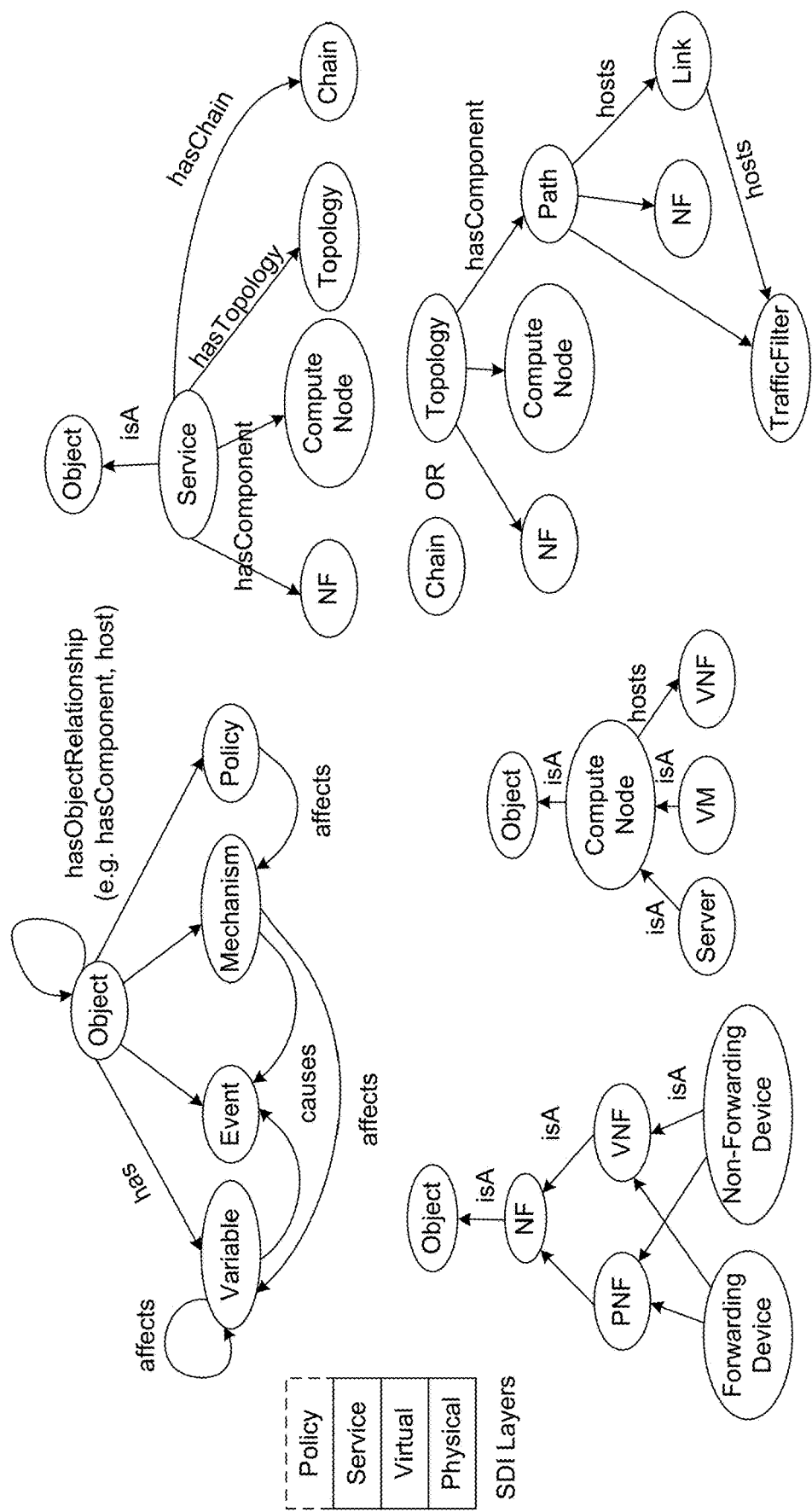
FIG. 4 illustrates an exemplary model.

To enable generic inference, the concept of types and instances may be used to create generic models representing an SDI environment. FIG. 4 illustrates an exemplary high-level view of a generic model. An exemplary part of KG 137 models that may be built for a virtualized EPC service is shown in Listing 7 below.

Listing 7: Knowledge Graph

EPC isA Service
Service hasComponent NF
EPC hasComponent NF
EPC1 hasType EPC
EPC2 hasType EPC
VNF isA NF
MME isA VNF
MME1 hasType MME
EPC1 hasComponent MME1
Server isA ComputeNode
Server hosts VNF
Server1 isA Server
Server2 hosts MME1
MME.usage isA UsageVariable
MME1.usage hasValue 90% [timestamp=123]

The timestamp property is only shown on one of the facts for brevity. As seen from Listing 6, the generic model information from FIG. 4 may be encoded as static knowledge in KG 137 itself which may allow queries to be generic by only needing to understand the semantics from the model in FIG. 4 and then using that knowledge to query for specific instantiations of the model. This allows the query primitives built on top of such a KG to not have any hardcoded domain knowledge about specific services. For further context, using queries a query writer can write a query to get information without having knowledge of network topology. For example, if there are 10 instances of a VNF type "Load Balancer". And you want to find what devices are directly/indirectly connected to that instance you can write a query. And the system would find the instance and then all the connected components.

The generic knowledge itself can be at two levels, e.g., as seen from FIG. 4, Service is a generic object or type. Then, EPC is an instance of that type and then EPC1 is a specific instance of EPC itself. The generic knowledge model at the first level is considered as static knowledge inserted by domain experts at system initialization time into KG 137. Query and inferencing applications built on top of KG 137 understand the semantics of the model at this level. For example, query and inferencing applications know what a 'hasComponent' relationship means, and how to use it to query for the components of any object of type service. The generic knowledge at the second level does not need to be encoded within the query primitives, but should be inserted into KG 137. For example, for an object of type service, such as EPC, this may involve obtaining knowledge about the generic service topology, control and data protocol interactions, state variables, or configuration variables that exist in service and component templates in an SDI orchestration platform, and inserting them into KG 137 as specific instances of a generic model. For example, generic EPC relationships such as, EPC hasComponent SGW may be encoded KG 137.

Knowledge about any area (e.g., based on vendors) templates or domains may be encoded into KG 137 using the extensible modeling approach shown in FIG. 4.

After obtaining static knowledge in KG 137, monitoring applications may dynamically insert updates to KG 137 reflecting the current state of SDI sandbox 120 (e.g., service and network object instances like SGW1, or EPC1), the current state of data-driven query primitives, and corresponding impact detection applications can become possible. For example, the orchestration of new service instances like EPC1 or EPC2 may be logged by the monitoring module 125 and inserted in KG 137. This may cause new facts that represent the service instances to become available in KG 137. For example, facts about current protocol (e.g., GPRS tunneling protocol user plane), peering locations (e.g., various geographical locations), performance metrics (e.g., bandwidth, latency, or jitter), or configurations (e.g., MME or SGW configuration). VNF migrations, load balancing, start and stop of components, configuration changes, and other changes in the state of SDI sandbox 120 may cause KG 137 to be updated accordingly.

A conventional query primitive in a KG may be considered a subgraph matching algorithm which takes as input one or more tuples or a subgraph in which one or more of the edges and nodes may be constant, acting as constraints, or acting as variables, and the query primitives then finds the bindings for those variables such that they follow the pattern dictated by the constants. For example, Listing 8 shows a KG query, where X_Var and Y_Var are variables while the rest are constants. Running this query against KG 137 represented by Listing 7 may return the results [X_Var=EPC1; Y_Var=MME1] since only EPC1 matches this pattern and not EPC2. Finally, delete in KG is a query with the additional action of deleting the facts that fit the queried pattern.

---
Listing 8: Query
---
X_Var hasType EPC
X_Var hasComponent Y_Var
Return X_Var
---

Figure 5:
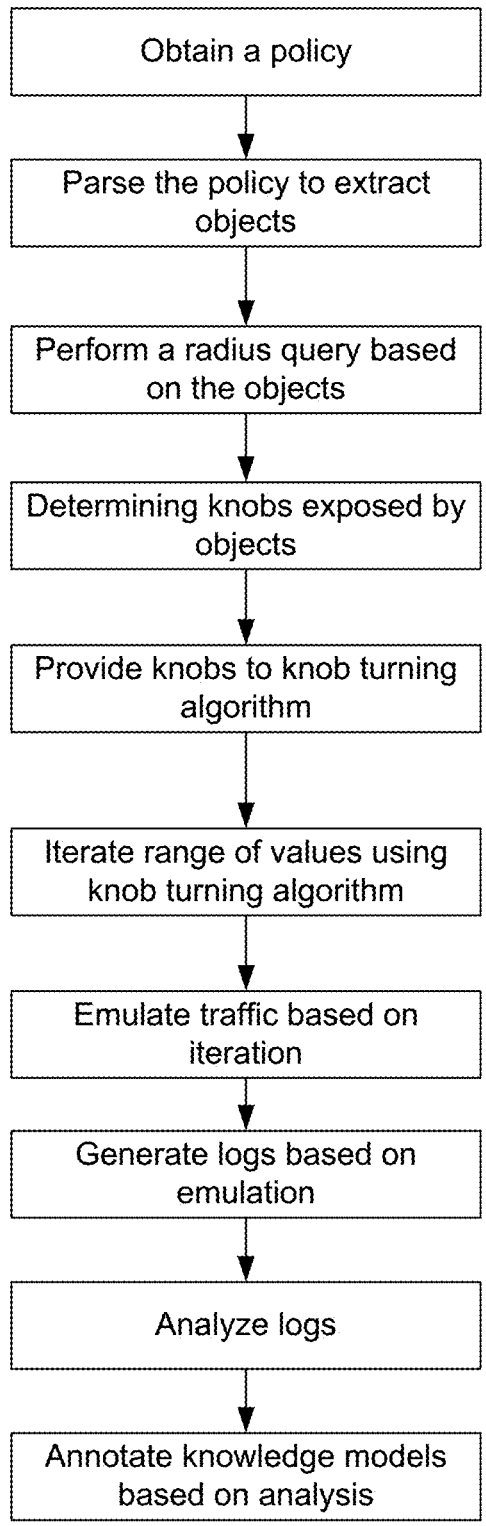
FIG. 5 illustrates an exemplary method for Depo.

Given the policy to check for impact, Depo policy stager 131 may learn its impact by emulating it in SDI sandbox 120 and learning from the collected logs. In summary, the following tasks may be performed: 1) generating emulation environment suitable for testing this policy in the sandbox SDI (e.g., step 141-step 146 of FIG. 5); 2) running emulation in SDI sandbox by running traffic through it and collecting logs (e.g., step 147-step 148 of FIG. 5); and 3) learning impact and annotating domain knowledge models by analyzing the collected logs (e.g., step 149-step 150 of FIG. 5). FIG. 5 illustrates an exemplary method for implementing Depo.

At step 141, one or more policies 129 may be obtained by Depo 130. In an example, a policy can be at the service level or network level. A network infrastructure policy can say that if the last five minutes CPU load of VNF's of type SGW is beyond 80% then create a new instance of SGW VNF. The policy may be obtained from a remote or local device. Listing 1-Listing 6 show example policies that may be written for an SDI environment with services, such as services associated with FIG. 2A (EPC) or FIG. 2B (e.g., SMORE). Depo 130 may be located on a network device, such as software defined network node (e.g., a server) or another device. At step 142, the one or more polices 129 may be parsed to extract object types. For additional context, in order to run emulations for the policy, Depo 130 should generate an emulation environment that includes the objects referenced by one or more polices 129 (e.g., an EPC policy may require instantiation of an EPC service in emulation). Parsing allows Depo 130 to extract the object types referenced in the one or more policies 129 (also referred to herein as policy specification). For example, parsing the policy in Listing 3 may extract multiple object types, such as SGW or EPC. Below this may be referred to the SGW scaling policy.

At step 143, a radius query may be performed based on the object types of step 142. The statically parsed (e.g., extracted) object types from one or more polices 129 may not include sufficient information to generate an emulation for a given policy. For example, if EPC object type was extracted then each of its components may need to be instantiated on objects of type ComputeNode (e.g., server or VM). In this example, these types were not explicitly specified in the policy. Moreover, if the SGW scaling policy were written in a way such that it only referenced a 'component' type such as SGW (and not EPC), then Depo 130 may need to obtain the 'container' type for SGW (e.g., the EPC service type) so that it may instantiate EPC and the components of EPC on objects of type ComputeNode. This is because Depo 130 may not instantiate a detached component in the emulation, instead instantiation may happen at the service level. Availability of knowledge based models helps Depo 130 automate the process of obtaining the needed addition information as follows.

Figure 6:
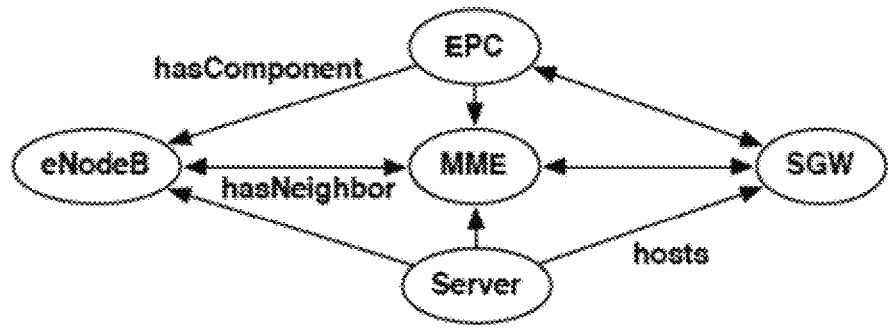
FIG. 6 illustrates an exemplary update policy subgraph.
Figure 7:
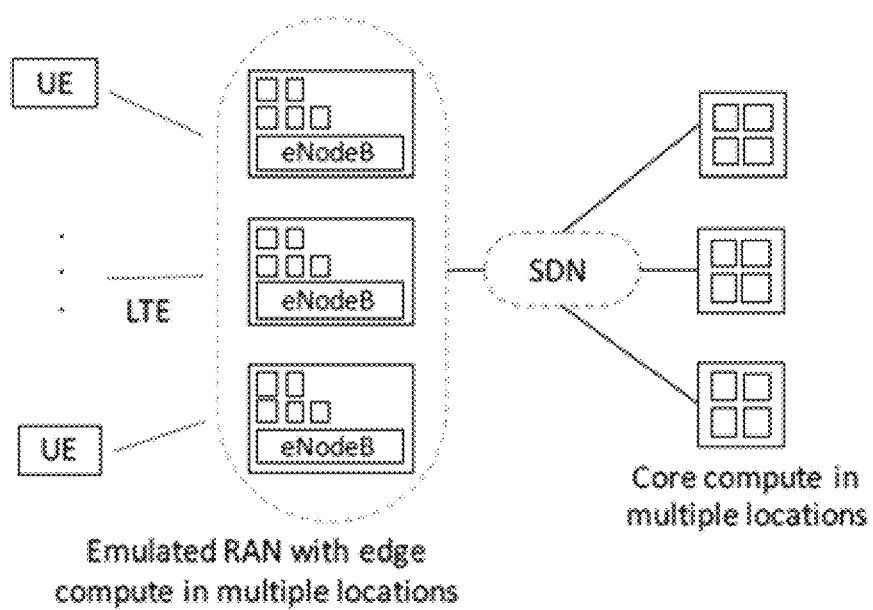
FIG. 7 illustrates an exemplary topology with multiple locations.

With continued reference to step 143 of FIG. 5, for each parsed object from step 142, Depo 130 may perform a 'radius' query that may be implemented on KG 137 to find a given object type's 'neighbors'. Radius is a conservative query. It considers logical, physical, or protocol level neighbors. For example, neighbors for the SGW type may include the service it is a component of (encoded using componentOf relationships), SGW's protocol neighbors (encoded using hasNeighbor relationships), or the type of objects that can host an SGW (encoded using hosts relationships). For example, KG 137 may have facts such as, SGW isA VNF, ComputeNode hosts VNF, Server isA ComputeNode, Service hasComponent VNF, EPC isA Service, EPC hasComponent SGW, EPC hasComponent MME, etc. This knowledge may be obtained from extraction of knowledge from SDI templates as explained earlier or from the modeling approach performed by domain experts. The knowledge may have been inserted into KG 137 at bootstrapping time (shown in FIG. 3 using static information or domain experts labels). Here a part of bootstrapping may include loading initial infrastructure and network configuration information. Since generic knowledge related to neighbors (FIG. 4) is encoded in radius query's implementation, this allows it to be generic and still be able to retrieve specific relationships about instances. For example, radius understands generic concepts of service, component, and hasComponent relationships, and so knowledge about specific service or component instances such as EPC and its SGW or PGW components may be extracted by radius automatically. Radius query thus may allow Depo 130 to obtain a list of the object types needed for emulation environment creation for the given policy. For the SGW scaling policy where SGW and EPC object types were statically parsed, FIG. 6 shows an exemplary result of the radius search that extracts their neighbors in various directions. This forms the list of object types to be created in emulation. By finding object types that are related to the policy and thus are under its impact radius, this step 143 in may allow reduction in the number of object types that need to be created in emulation for the given policy. A goal here is to identify the type of the object and the service in which its being used and if there are 10 instances that are being used we can create only 1 instance to emulate a particular functionality.

At step 144, based on the objects of step 142 or step 143, determining knobs exposed by the object. Each object from the list of object types found at step 142 may have configurable variables that are tagged (e.g., previously tagged by a by the domain expert) as emulation environment parameters in the object's template. For example, emulation environment parameters may include 1) number of SGWs and the number of its neighbor objects to create, 2) the types of servers for hosting the SGWs and their neighbors, or 3) the VM sizes to generate for hosting the SGWs and their neighbors. Other parameters may include VM.size, Server.type, or EPC.numSGW, among other things, which may be configurable parameters. Similarly, the workload that may be run on these emulation environments may also have workload variables 128 that can be configured, such as rate of requests or number of clients. The threshold variable THRESH may also be taken as an emulation parameter. These emulation parameters may be termed knobs. Knobs may be turned (also referred to as knob turning), where each configuration of the knob values may cause one or more polices 129 to have a different impact on SDI sandbox 120.

A new emulation may be used for each knob turn. Alternatively, knobs that represent workload variables may be knob turned within the same emulation, e.g., traffic rate can be varied within the same emulation. Knob examples may include configuration variables for object types (e.g., EPC.numSGW, EPC.numPGW, Server.type, or VM.numCPU) or workload variables that can be used to control the workload generation process (e.g., EPC.requestRate, EPC.numClients, or Server.otherVMs) Server.otherVMs may be used for creating server load emulating other services and their VMs besides, such as the one EPC instance for the provided policy example herein.

At step 145, providing the determined knobs of step 144 to a knob turning algorithm, as disclosed in more detail herein. At step 146, a knob turning algorithm iterates on the range of values for each knob and outputs a configuration of knob values. In this way, multiple knob configurations are output by the algorithm, where each configuration is then used by the policy stager 131 to direct the orchestration of emulation in SDI sandbox 120. At step 147, based on output of step 146, traffic for emulation is generated. Depo 130 configures traffic generator 134 with values output by the knob turning of step 146, such as workload values. Traffic generator 134 may be configured to generate traffic for various types of services present in the emulation. The duration for the emulations may be based on different factors. Note that a knob turning algorithm generates different configurations. For an EPC instance emulation it can mean creating varying number of UEs for emulation, creating specific amount of requests from each UE, accessing video, voice, data application from UEs, or the like.

At step 148, logs of the emulation of step 147 may be generated and collected. Traffic generation causes the emulation to generate logs. For example, the logs collected for analysis may include information about network object instances and service object instances and the logs for their state variables, and object instances' mechanism invocations (traces of policy action invocations). At step 149, analysis of the logs may occur and at step 150, knowledge models may be annotated based on the analysis of step 149. An alert message may indicate the components that will be impacted. Step 149 and step 150 disclosed in more detail below.

With continued reference to step 149, the analysis of logs of step 148 gives the specific object IDs (instances) whose mechanisms were invoked by the policy and the state variable logs of those objects. This list of objects IDs may be under the policy's direct impact radius. For each object ID in the list, a 'radius' query may be done on KG 137 which traverses the neighbor relationships each object has with other objects. This query helps obtain a list of additional potentially impacted objects since they are neighbors to the directly impacted objects found earlier. These two lists may be combined to create the (potentially) impacted objects list. Thus, this list creation process filters out other object instances in SDI sandbox 120 that are not under the policy's impact radius. Note the system may implement more than one query. "Radius" query is one of them. Idea is that using these queries and some coding there can be an understanding of the impact of a policy on network objects.

A policy's impact travels from policy action→mechanisms→configurable variables→observed variables, in the presence of emulation parameters and workload variables. For additional context, there may be a customer with a home router. A policy to restrict the bandwidth usage for each user to 10 Mbps during evening hours would be implemented using mechanisms that required changing configurable variables (e.g., bandwidth quota or router table settings, etc.). This may result in bandwidth reduction of the user which may be an "observed variable." Policy is abstracted from underlying infrastructure. Mechanism is dependent on the underlying controllers and infrastructure. Configurable Variables are configurations that are changed. Observed Variables are values that are changed after variables are configured.

With that said, Depo 130's impact quantification may find the presence of this impact and attempt to quantify it by learning from the collected logs and creating new models that capture the impact (or updating them if they already exist, with new logs). Multiple policies may use the same mechanisms and so it may be useful to determine and record the relationship between mechanisms and configurable variables, and between configurable variables and observed variables.

For a given policy's action, first, impact quantifier 135 may retrieve the during-action-execution, before-action-execution, or after-action-execution logs. How far into the past to get the logs from may be controlled by TBefore and how far into the future to get the logs from may be controlled by TAfter. Both are tunable parameters and can be set globally or per variable. Impact quantifier 135 may perform before-during and before-after comparison of variables that exist on objects in the aforementioned object list. A 2-sample Kolomogorov-Smirnov (KS) test may be used for this comparison. See Frank J Massey Jr. 1951. The Kolmogorov-Smirnov test for goodness of fit. Journal of the American statistical Association 46, 253 (1951), 68-78, which is incorporated by reference in its entirety.

In an example, given two distributions, KS test returns a difference statistic D, and a p-value. The 'alpha' value for KS test is a tunable parameter. If the output p-value is less than or equal to the alpha value then the two distributions are considered significantly different. The tunable parameter can change based on the service or infrastructure that is being checked for impact. It can depend on underlying distribution. Herein 0.05 is used, but it can be changed by user Thus, the output of the KS tests may give a table of mappings, {variable: CHANGE}, for all variables on the objects in our list, where CHANGE is a boolean variable with 'yes' if the KS test found that it was impacted by the policy, and 'no' otherwise. Note that the results may be combined for similar objects (e.g., the object instances of type server), thus larger number of instances depicting a large-scale network in the emulation increases accuracy of the KS test since more data samples are generated. The KS test may reduce the number of variables under consideration. Next, the quantifier may create a list with all variables that have CHANGE=yes in the table. The list may be further divided into multiple lists, such as a configurable variables list or observed variables list.

Supervised regression or classification machine learning models may be created where the configurable variables are taken as features, and their specific effect is observed on the observed variables of interest (e.g., latency, usage). During the search, the dataset is divided into training and test sets with specific percentages (e.g., 20% as test data, 80% as training). K-fold cross validation may be used to further test for bias and produce model accuracy values, the model with the highest accuracy value may be chosen. In k-fold cross-validation, the original sample may be randomly partitioned into k equal sized subsamples. Of the k subsamples, a single subsample may be retained as the validation data for testing the model, and the remaining k−1 subsamples may be used as training data. The cross-validation process may then be repeated k times, with each of the k subsamples used once as the validation data. The k results may then be averaged to produce a single estimation. Using this method over repeated random sub-sampling may allow for all observations to be used for both training and validation, and each observation may be used for validation once.

While the earlier KS tests may indicate that there is 'an impact' or 'an effect' between the configurable and observed variables (a Yes/No answer), the machine learning models enable more fine-grained impact finding and capture knowledge about the type of relationships (e.g., linear, non-linear, exponential, etc.), and the environment in which these relationships apply (e.g., other environment variables captured as features in the models). Note that a model may be created for each observed variable under consideration (where CHANGE=yes was observed), where the configurable variables serve as features (e.g., machine learning model features for the training of ML model), and the observed variable as the dependent variable.

With continued reference to step 150, domain knowledge models may be annotated.

The variables that were tagged as having CHANGE=yes may be recorded within KG 137 as 'affects' relationships among variables, mechanisms, and policies. These 'affects' relationship edges may be annotated with the p-values (or the like) obtained using KS tests. Fisher's method of combining p-values may be used when existing facts are updated with new results. See Ronald A Fisher. 1925. Statistical methods for research workers Oliver and Boyd. Edinburgh, Scotland 6 (1925) and Jessica Gurevitch, *Julia* Korichéva, Shinichi Nakagawa, and Gavin Stewart. 2018. Meta-analysis and the science of research synthesis. Nature 555, 7695 (2018), 175, which are incorporated by reference in their entirety. This combining process depicts increase or decrease in the strength of the affects relationships. That is, due to these updates, if the p-value on an affects relationship becomes less than or equal to a given alpha value (e.g., common alpha is 0.05 for getting 95% confidence) then it depicts KG 137 nodes connected by the affects relationship have a statistically significant affect on each other (e.g., with 95% confidence if alpha is set to 0.05).

Disclosed below are more details with regard to knob turning (e.g., step 144-Step 146). Knobs help in the exploration of various configurations of objects in emulations in order to test the impact of policies on observed variables (e.g., latency, throughput). Since there may be no domain knowledge about what effect the various values of the configurable variables may have on the observed variables, a process of coordinate descent may be used, where a coordinate is a configurable variable, and pick N number of uniformly distributed values for this variable. The uniform distribution may allow for an entire range of the variable to be approximately covered, particularly in view of no prior knowledge. Note that coordinate descent is an optimization algorithm that successively minimizes along coordinate directions to find the minimum of a function.

These N values may become the starter set to begin creating the emulations and trying out the policy within them. As described later, the results of emulation runs may be collected in order to generate a dataset that may be used for creating machine learning models which depict the effect of the starter set on the observed variables. The dataset collected may be divided, in which part of it is used to train the models and the other part is used as ground truth to test the accuracy of the models. If the accuracy is lower than a threshold for the starter set, more values may be generated through knob turning and the collection of more data through emulations.

For configuration variables whose range is numeric or ranked in which the range of values have some pattern (e.g., EPC. numSGW is a numeric variable, while Server.type can be a ranked variable with the ranking done in terms of numCPUs on each machine type.

The starter set values for a given variable may divide the variable's range into multiple intervals. For example, if the range of a numeric variable is 1 to 100, and the starter set contains 10, 43, 79, then 3 intervals are created. Set a minimum interval size after which exploration through emulations should stop. For each interval, if the interval size is above the minimum size threshold, then take the dataset collected so far through emulations, and pick M samples from the dataset such that they all belong to the given interval. Use the model created from the dataset so far and input the M samples as feature values and predict the observed variable, e.g., the dependent variable in the model. Similarly, calculate the prediction accuracies for the other intervals. Ignore the intervals that have acceptable accuracy. From the intervals with accuracy lower than threshold, pick the widest interval with the highest inaccuracy value and perform the recursive process of picking starter values from this interval and performing emulations to get more data for them, then rechecking the accuracies for all past and newly generated intervals, and exploring the widest interval with the highest accuracy. This procedure allows us to find wide intervals that may be the most inaccurate according to the calculated machine learning models, thus greedy exploration (greedy algorithm used) in those intervals that will give us the most gain in terms of reducing uncertainty in the model. A stopping condition may be set using parameters for the smallest interval size threshold after which exploration should stop or an accuracy threshold after which the exploration should stop, or max number of emulations to run threshold which can be useful since a low accuracy score for the models may not always mean more emulations will help since it might be an issue related to missing variables, or incorrect variable creation by the domain experts, such issues cannot be automatically found since Depo 130 cannot learn about variables that are non-existent for it. Note that when the knob turning process generates a configuration of various knob values, and Depo 130 attempts to generate an emulation environment using those knob settings using orchestrator 123, orchestrator 123 checks the validity of the configuration to see if it can be instantiated. Domain Expert is the person or device that has knowledge about the network domain being emulated.

Disclosed below are implementation and evaluation examples for Depo architecture. Disclosed herein is an example in which the approach is evaluated over a testbed SDI with a 4G LTE/EPC broadband service.

Environment setup and workload. The SDI orchestrator 123 and common service and object templates 122 may be extended. The templates may be modified with additional mechanisms and variables to allow creation of richer policies. In an example implementation, Drools may be used for policy specification. SDI may include UE traffic generation based on configurable parameters where the parameters are configured and varied as part of Depo's knob turning.

Policy impact Listing 1 to Listing 6 show use case policies. Depo 130 may output and learn the trace of each policy as it invokes mechanisms on SDI objects, affecting their configuration variables, which in term impact the observed variables. For example, Listing 11 shows the SDI-level edge-server update policy's invoked mechanisms. The policy action may take the following strategy: Divide the servers to be updated in two batches, update one batch at a time by migrating VMs to available servers and stopping the remaining VMs, install updates then restart VM and VNF. Table 2 shows Depo learns the find-grained impact from the various mechanisms invoked by the policy, on objects and their variables.

The table captures only those object variables that the policy impacted in a statistically significant way, as seen from calculating p-values and setting their alpha to 0.05. Recording this in KG 137 allows Depo 130 to know which mechanisms have impact on which variables, which helps Depo 130 in the emulation environment generation phase by reducing the policy's potentially impacted neighbors, meaning that knob turning may be done on less object variables in newer iterations of emulations. This is also may be useful for the policy writer since it traces their policy across various SDI objects. For example, for the SGW scaling policy, Listing 12 is output. Listing 9 and Listing 10 show additional output examples (for SMORE edge cloud offloading related policy for turning on caching, and enabling edge cloud offloading functionality dynamically on EPC).

Listing 9: Affected variables for various object types in SMORE caching policy use-case.

PolicyAction:setCaching
   SMORE:
      smore_cachingStatus
      smore_latency
   SMORE_Loadbalancer:
      smore_loadbalancer_cachingStatus
      smore_loadbalancer_availableCacheSize
      smore_loadbalancer_usedCacheSize
      smore_loadbalancer_resourceFrequencyOfAccess
   SMORE_Webserver:
      smore_webserver_status
      smore_webserver_networkConfig
      smore_webserver_loadbalancerConnectionStatus
      smore_webserver_cpuUsage
      smore_webserver_memUsage
      smore_webserver_resourceFrequencyOfAccess

TABLE 2

Affected variables learned for update policy

| Mechanisms | Variables |
| --- | --- |
| PolicyAction:update | Server.[status, version, numVM, memUsage, cpuUsage, percentFailedMigrations], VM.[status, memUsage, cpuUsage], VNF.[status, memUsage, cpuUsage], Service.[smoreLatency] |
| Server.migrateVM | Server.[numVM, memUsage cpuUsage, percentFailedMigrations], VM.[status, memUsage, cpuUsage], VNF.[status, memUsage, cpuUsage], Service.[smoreLatency] |
| Server.sendVM | Server.[numVM, memUsage cpuUsage], VM.[status, memUsage, cpuUsage], VNF.[status, memUsage, cpuUsage], Service.[smoreLatency] |
| Server.receiveVM | Server.[numVM, memUsage, cpuUsage, percentFailedMigrations], VM.[status, memUsage, cpuUsage], VNF.[status, memUsage, cpuUsage], Service.[smoreLatency] |
| VM.stop | Server.[memUsage, cpuUsage], VM.[status, memUsage, cpuUsage], VNF.[status, memUsage, cpuUsage], Service.[smoreLatency] |
| Server.installUpdate | Server.[status, version, memUsage, cpuUsage] |
| Server.reboot | Server.[status, memUsage, cpuUsage] |
| VM.start | Server.[memUsage, cpuUsage], VM.[status, memUsage, cpuUsage] |
| VNF.start | Server.[memUsage, cpuUsage], VM.[memUsage, cpuUsage], VNF.[status, memUsage, cpuUsage], Service.[smoreLatency] |

Listing 10: Affected variables for various object types in EPC offloading to SMORE policy.

PolicyAction:augmentSMORE
    Server:
        server_numVM
        server_cpuUsage
        server_memUsage
        server_allocated_mem
        server_num_allocated_cpu
    VM:
        vm_status
        vm_networkConfig
        vm_cpuUsage
        vm_memUsage
    SMORE:
        smore_latency
    SMORE_Loadbalancer:
        smore_loadbalancer_webserverNumConnections
        smore_loadbalancer_webserverPercentOfConnectionsWorking
        smore_loadbalancer_resourceFrequencyOfAccess
    SMORE_Switch:
        smore_switch_status
        smore_switch_routeConfig
    SMORE_Webserver:
        smore_webserver_status smore_webserver_networkConfig
        smore_webserver_loadbalancerConnectionStatus smore_webserver_cpuUsage
        smore_webserver_memUsage smore_webserver_resourceFrequencyOfAccess Listing 11: Invoked mechanisms hierarchy for Server up- date policy PolicyAction:update
    Server.migrateVM
    Server.sendVM
    Server.receiveVM VM.stop
    Server.installUpdate
    Server.reboot
    VM.start
    VNF.start Listing 12: Affected variables for scaleUpSGW policy PolicyAction:scaleUpSGW
    Server:
        server_numVM
        server_cpuUsage
        server_memUsage
        server_allocated_mem
        server_num_allocated_cpu
    VM:
        vm_status
        vm_networkConfrg
        vm_cpuUsage
        vm_memUsage
    EPC:
        epc_numSGW epc_latency
    SGW:
        sgw_status sgw_networkConfig
        sgw_mmeNumConnections
        sgw_mmePercentOfConnectionsWorking
        sgw_cpuUsage sgw_memUsage
    MME:
        mme_numSGW
        mme_sgwNumConnections
        mme_sgwPercentOfConnectionsWorking Variable reduction and cause of impact. Knowledge-based model learnt from emulations in Depo allows operators to find 'what' was the cause of impact on observed variables of interest. For example, our Server CPU oversubscription policy invokes mechanisms on different SDI object instances, and causes their configuration variables to change, which ultimately results in impact on observed variables, e.g., SMORE response time.

We use our generated ML models to quantify the impact that each of the invoked mechanisms has on various configuration variable, which in turn affect observed variables. For example, Table 3 shows relative impact caused on SMORE response time by the various configuration variables modified by the policy, the various emulation environment parameters (such as num of neighboring VMs), and the workload variables (e.g., SMORE request rate). Thus, in figuring out the policy impact on a given observed variable, Depo considerably reduced the potentially impacted object types and variables down from the ones shown in Table 1. The statistical significance testing (with significance alpha value set to 0.05 or 5%) is embedded in Depo process and helps ensure correctness (confidence that the object is getting impacted).

Performance results. Here, we present performance results for each stage of the Depo process to show the scalability of our approach and use of KG 137 data structure.

In this example, Depo's policy parsing time is impacted by the policy size, which is dependent on the number of object types and actions inside the policy specification. FIG. 10 shows this effect for policy specifications in Drools language. The parsing time stays below 5 s for up to a 1000 object types and actions. Since the number of objects and actions in our example policies were relatively small, we show scalability by generating policies using arbitrary object types and actions and running the parser on them.

FIG. 11 shows the time for emulation parameter generation using our knob turning approach. As described in the Depo process earlier, this stage may be dominated by time spent on queries into KG 137 for searching neighbor object types that are potentially under impact radius of the object types parsed from the policy. The time is thus affected by the number of neighboring objects N, that exist in KG 137 for a given object type parsed from the policy. So, in order to show scalability for this phase, we add increasing number of semantically correct but arbitrary relationships among KG nodes in a controlled fashion. FIG. 11 shows the time for parameter generation stage for different values of N. Since multiple object types can be parsed from a given policy, parameter generation stage will have to perform KG queries for extracting neighbors of each of the parsed object types. Thus, the same figure here also shows effect of such concurrent queries on KG 137. Our correctness checking assertions showed that the queries are able to retrieve all objects types that had been created as neighbors in KG 137.

FIG. 8 shows the emulation environment generation time, which is the SDI orchestration time for the various object types that need to be instantiated for a given emulation. The figure shows time stays below 40 s for up to 125 SDI object instance creations, where instances are for various types of object templates available to us and are instantiated and configured in parallel where possible (e.g., a host VM has to be instantiated before the VNF it will host). FIG. 12 shows the data analysis stage average time for our policies, which is dominated by the concurrent KS tests and ML model generations. The figure shows the time stays low as number of logs used for the analysis increases by increasing duration and number of emulations. The number of logs depends on the number of object variables related to the policy and the logging frequency. We set this frequency for observed variables (e.g., latency) to be is in the SDI monitoring module, and the configuration variable changes that happen through software were logged whenever the software updated them.

Time for final stage of Depo process is dominated by annotating KG 137 based on the knowledge learnt in data analysis. FIG. 9 shows fact insertions (shown as equivalent to existing fact updates), the time stays below 3 s for up to 1000 concurrent insertions.

Note the following with regard to statically parsed (e.g., extracted) as disclosed herein. Static information is something that can be extracted from the system based on its topology information. Based on its service information. For example, we can extract that a particular VNF will be connected to which particular VNF from a service template. For this we don't need to instantiate VMs we can extract them statically.

Figure 14:
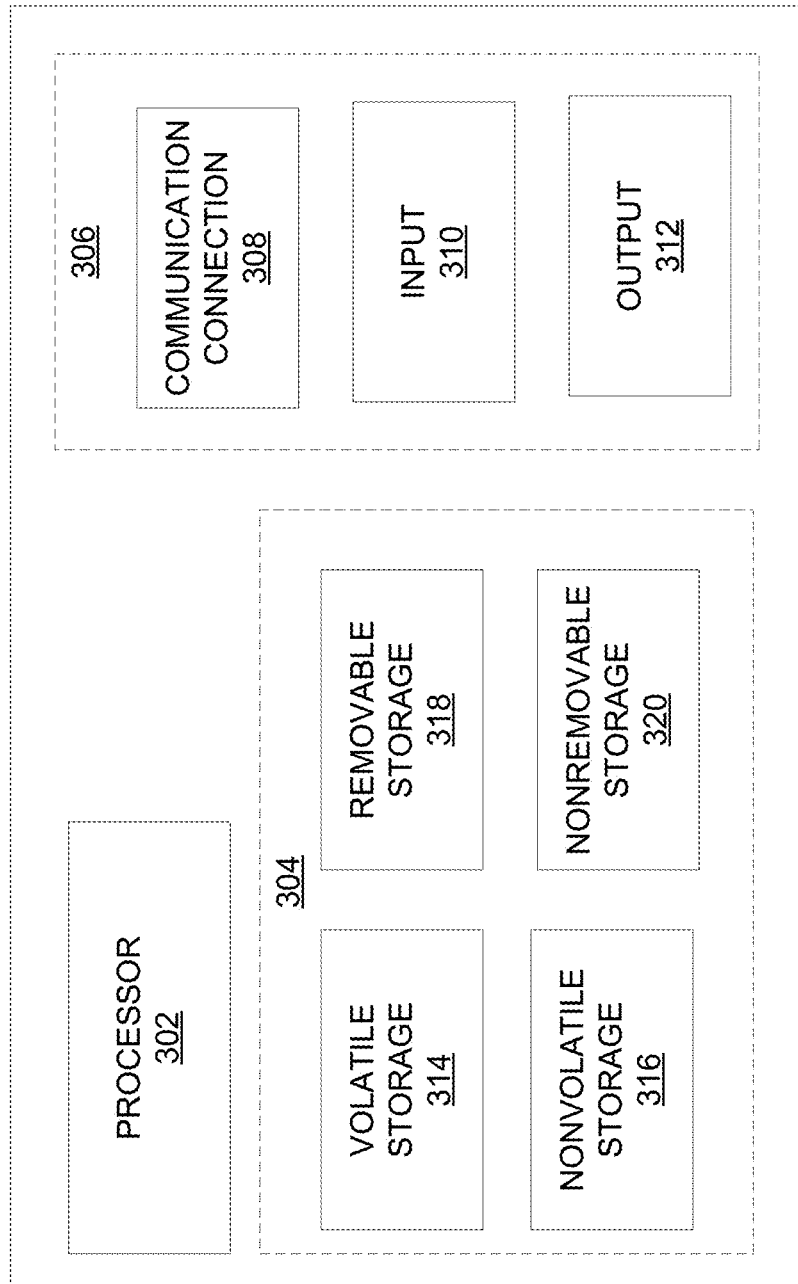
FIG. 14 illustrates a schematic of an exemplary network device.

FIG. 14 is a block diagram of network device 300 that may be connected to or comprise a component of FIG. 2A, FIG. 2B, FIG. 3, among others herein. Network device 300 may comprise hardware or a combination of hardware and software. The functionality to facilitate telecommunications via a telecommunications network may reside in one or combination of network devices 300. Network device 300 depicted in FIG. 14 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 14 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 14) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3 G/4 G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 15:
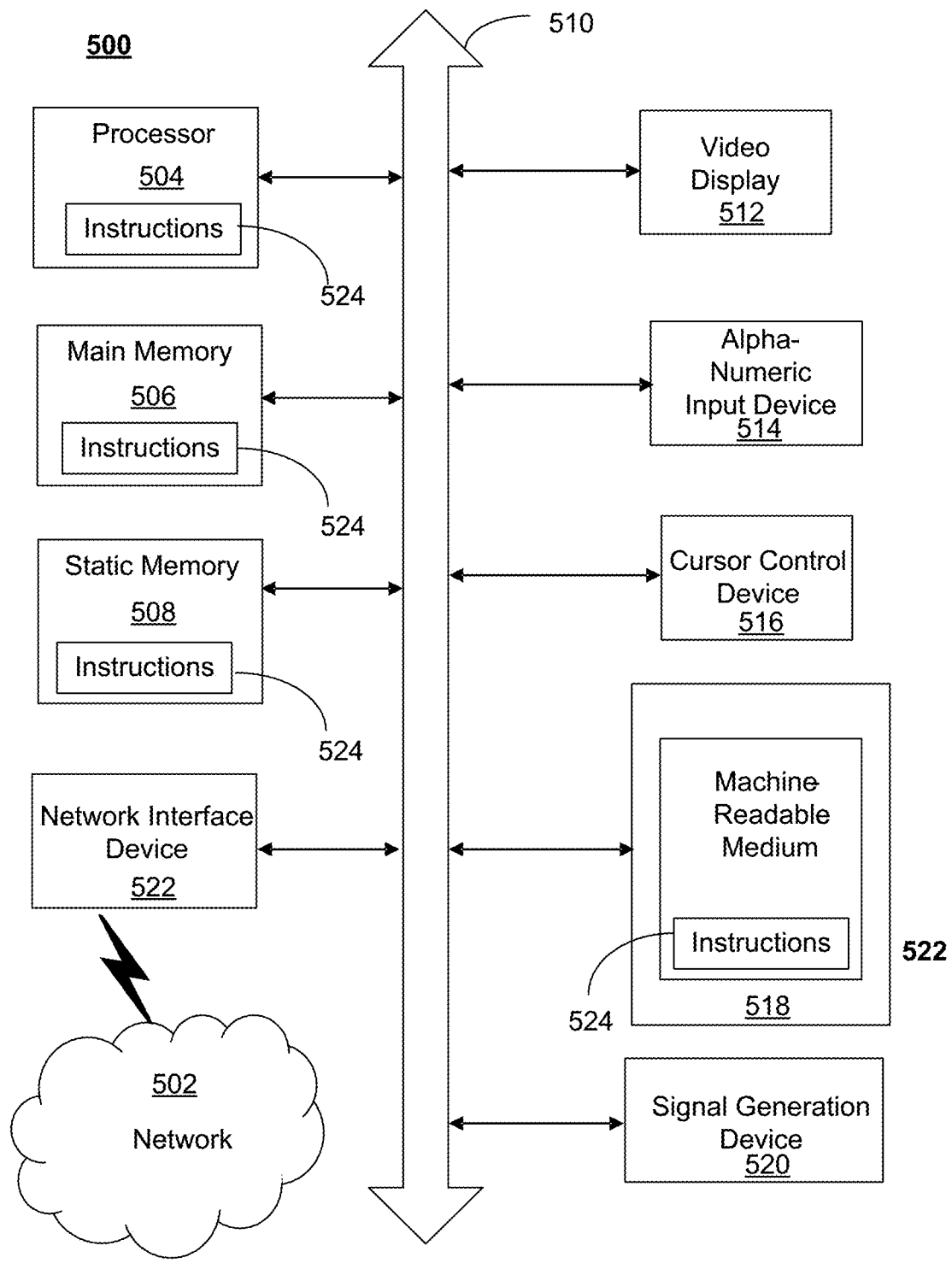
FIG. 15 illustrates an exemplary communication system that provides wireless telecommunication services over wireless communication networks.

FIG. 15 depicts an exemplary diagrammatic representation of a machine in the form of a computer system 500 within which a set of instructions, when executed, may cause the machine to perform any one or more of the methods described above. One or more instances of the machine can operate, for example, as processor 302, eNB 113, PGW 117, SGW 116, MME 118, and other devices of FIG. 2A, FIG. 2B, or FIG. 3. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 16A:
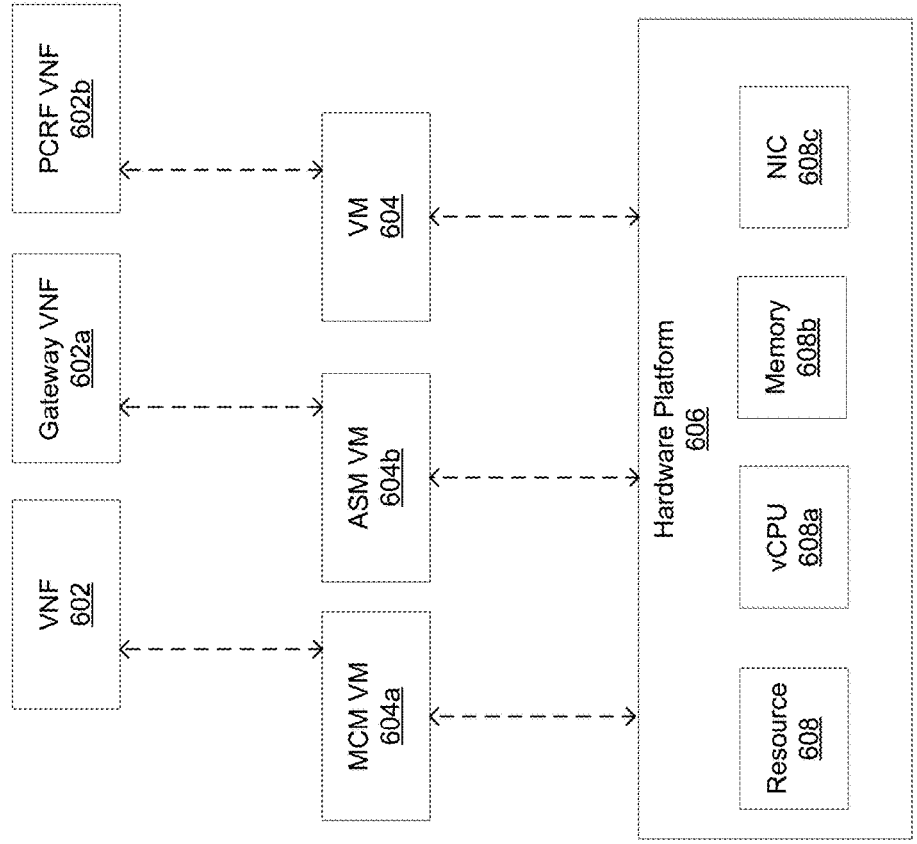
FIG. 16A is a representation of an exemplary network.

FIG. 16A is a representation of an exemplary network 600. Network 600 (e.g., physical network 111) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 16A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 16A illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 16B:
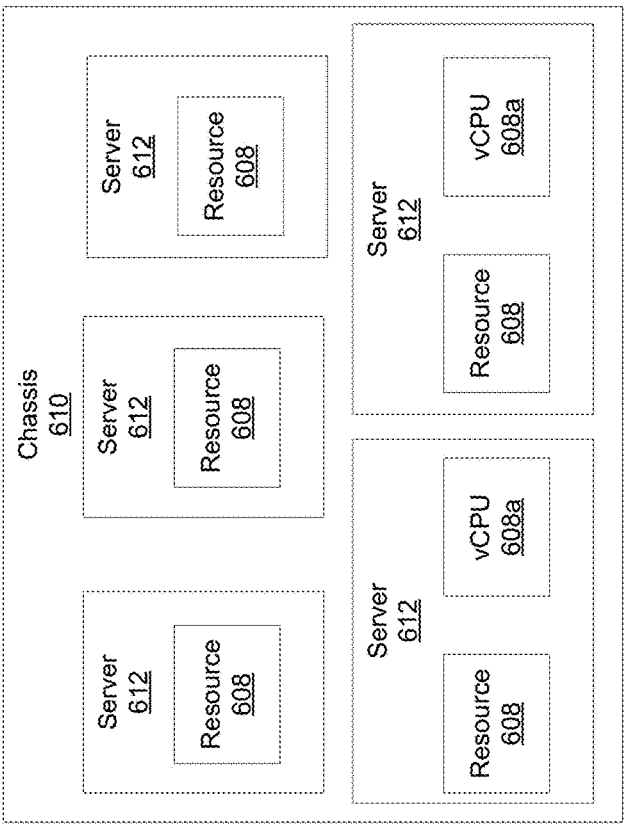
FIG. 16B is a representation of an exemplary hardware platform for a network.
Figure 16B:
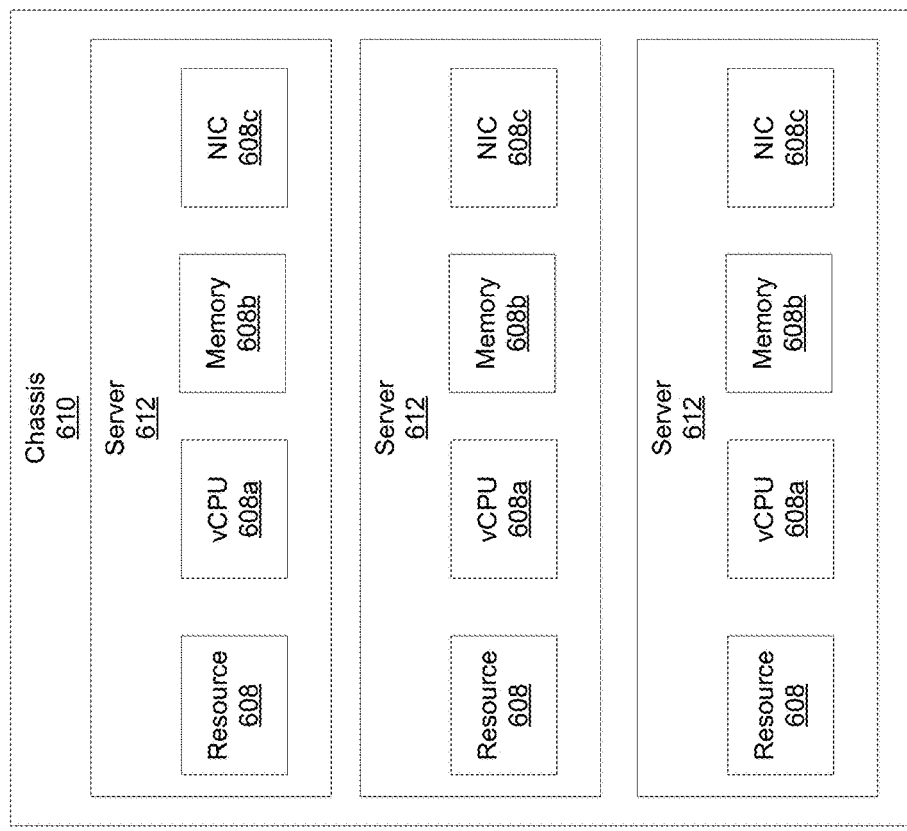

While FIG. 16A illustrates resources 608 as collectively contained in hardware platform 606, the configuration of hardware platform 606 may isolate, for example, certain memory 608c from other memory 608c. FIG. 16B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 16B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which Depo architecture messages can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—Depo architecture—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for emulation of services and detecting impact of planned network maintenance. A method, system, computer readable storage medium, or apparatus may provide for obtaining a policy for maintaining a service; parsing the policy to extract a first object; querying for a second object based on the first object; based on the first object and the second object, generating a software-defined infrastructure; and determining a significant variable for the service, wherein the significant variable is determined based on the p-value of the variable reaching a threshold; based on the significant variable of the service, generating traffic for an emulation; collecting logs associated with the emulation; analyzing the logs to quantify the impact of a change of the significant variable; and annotating knowledge graph model of the service based on the quantified impact of the change of the significant variable. A method, system, computer readable storage medium, or apparatus may provide for obtaining a policy for maintaining a service; parsing the policy to extract a first object; querying for a second object based on the first object; based on the first object and the second object, determining workload variables exposed by the first object and the second object; emulating the service based on the first object, second object, and the workload variables; determining a significant variable for the service based on the emulating; and annotating knowledge graph model of the service based on an impact of the change of the significant variable. A method, system, computer readable storage medium, or apparatus may provide for obtaining a policy for maintaining a service; parsing the policy to extract a first object; querying for a second object based on the first object; based on the first object and the second object, determining workload variables or configuration variables exposed by the first object and the second object; and emulating the service based on the first object, second object, or the workload variables. All combinations in this paragraph (including the removal or addition of steps) are contemplated in a manner that is consistent with the other portions of the detailed description.

What is claimed:

1. A server comprising:
   a processor; and
   a memory coupled with the processor, the memory storing executable instructions that when executed by the processor cause the processor to effectuate operations comprising:
   obtaining a policy for maintaining a service;
   parsing the policy to extract a first object;
   querying for a second object based on the first object;
   based on the first object and the second object, determining workload variables exposed by the first object and the second object; and
   annotating knowledge graph model of the service based on the first object, the second object, and the workload variables.

2. The server of claim 1, the operations further comprising:
   based on the first object and the second object, determining configurations variables exposed by the first object and the second object.

3. The server of claim 2, wherein the configuration variables comprise number of serving gateways or number packet of data network gateways.

4. The server of claim 2, wherein the configuration variables comprise type of server or number of central processing units for a virtual machine.

5. The server of claim 1, wherein:
   the first object is a serving gateway,
   the second object is a mobility management entity.

6. The server of claim 1, wherein:
   the first object is a serving gateway, and
   the second object is a virtual network function.

7. The server of claim 1, wherein the first object is a serving gateway.

8. The server of claim 1, wherein:
   the first object is a network server, and
   the second object is a virtual machine.

9. The server of claim 1, wherein:
   the first object is an evolved packet core, and
   the second object is a packet data network gateway.

10. The server of claim 1, wherein:
    the first object is network server, and
    the second object is an eNodeB.

11. The server of claim 1, wherein the workload variables comprise request rate of an evolved packet core or number of clients of an evolved packet core.

12. A computer readable storage medium storing computer executable instructions that when executed by a computing device cause said computing device to effectuate operations comprising:
    obtaining a policy for maintaining a service;
    parsing the policy to extract a first object;
    querying for a second object based on the first object;
    based on the first object and the second object, determining workload variables exposed by the first object and the second object; and
    annotating knowledge graph model of the service based on the first object, the second object, and the workload variables.

13. The computer readable storage medium of claim 12, the operations further comprising:
    based on the first object and the second object, determining configurations variables exposed by the first object and the second object.

14. The computer readable storage medium of claim 13, wherein the configuration variables comprise number of serving gateways or number of packet data network gateways.

15. The computer readable storage medium of claim 13, wherein the configuration variables comprise type of server or number of central processing units for a virtual machine.

16. The computer readable storage medium of claim 12, wherein:
    the first object is a serving gateway,
    the second object is a mobility management entity.

17. The computer readable storage medium of claim 12, wherein:
    the first object is a serving gateway, and
    the second object is a virtual network function.

18. The computer readable storage medium of claim 12, wherein:
    the first object is a server, and
    the second object is a virtual machine.

19. The computer readable storage medium of claim 12, wherein:
    the first object is an evolved packet core, and
    the second object is a packet data network gateway.

20. The computer readable storage medium of claim 12, wherein:
    the first object is server, and
    the second object is an eNodeB.

* * * * *